(12) United States Patent
Mercier et al.

(10) Patent No.: US 7,021,664 B2
(45) Date of Patent: Apr. 4, 2006

(54) FUEL TANK FOR AN ALL-TERRAIN VEHICLE

(75) Inventors: Daniel Mercier, Longueuil (CA); Vincent Morin, Canton de Brompton (CA); Frank Dube, Valcourt (CA); Simon Carbonneau, St-Elie d'Orford (CA); Martin Talbot, Rock-Forest (CA)

(73) Assignee: Bombardier Recreational Products Inc., Valcourt (CA)

( * ) Notice: Subject to any disclaimer, the term of this patent is extended or adjusted under 35 U.S.C. 154(b) by 78 days.

(21) Appl. No.: 10/687,935

(22) Filed: Oct. 20, 2003

(65) Prior Publication Data

US 2004/0256853 A1     Dec. 23, 2004

Related U.S. Application Data

(60) Provisional application No. 60/419,106, filed on Oct. 18, 2002.

(51) Int. Cl.
*B60K 15/035* (2006.01)

(52) U.S. Cl. .................................................. 280/834

(58) Field of Classification Search ............... 280/830, 280/833, 834
See application file for complete search history.

(56) References Cited

U.S. PATENT DOCUMENTS

| 4,757,872 | A | 7/1988 | Inomata |
| 5,791,431 | A | 8/1998 | Asao et al. |
| 2002/0112907 | A1* | 8/2002 | Maeda et al. ............... 180/69.4 |

OTHER PUBLICATIONS

Internet web page http://209.35.200.206/sales/kawasaki/specs/2002/KVF650A1.htm 2002 Kawasaki Prairie 650 4×4—rear fuel tank on the side of the vehicle on the second page.
Internet web page http://houseofmotorcycles.bikebandit.com/parts Presenting 2002 Kawasaki Prairie 650 4×4 fuel tank in the OEM's parts catalog.

* cited by examiner

*Primary Examiner*—Kevin Hurley
(74) *Attorney, Agent, or Firm*—Osler, Hoskin & Harcourt LLP (57) ABSTRACT

An all-terrain vehicle with improved stability is provided. The all-terrain vehicle includes a frame that is substantially centered on a longitudinal centerline of the vehicle, an engine, a plurality of wheels that are attached to a front axle and a rear axle, a handle bar that is operatively connected to at least two of the wheels, and a straddle seat. A fuel tank is fluidly connected to the engine, and is disposed forward of the rear axle, substantially above a rear suspension pivot point, and below the seat, and is substantially centered on the longitudinal centerline, thereby improving the stability of the all-terrain vehicle.

17 Claims, 7 Drawing Sheets

FUEL TANK FOR AN ALL-TERRAIN VEHICLE

CROSS REFERENCE TO RELATED APPLICATIONS

This application relies for priority upon U.S. Provisional Application Ser. No. 60/419,106, entitled "FUEL TANK FOR AN ALL-TERRAIN VEHICLE," filed on Oct. 18, 2002, the disclosure of which is specifically incorporated herein by reference.

BACKGROUND OF THE INVENTION

1. Field of Invention

This invention relates to an all-terrain vehicle (ATV), and more particularly to an ATV having an improved fuel tank with an improved fuel tank location.

2. Description of the Related Art

ATVs are popular, largely because of their compact design and the utility they provide. ATVs are designed to move across flat and rugged terrain with relative ease. The compact design of an ATV gives it a high power-to-weight ratio, thereby allowing the ATV to travel across terrain that a full-sized four wheel drive vehicle could not.

In order for the ATV to be as stable as possible, it is desirable for the ATV to have a center of gravity as low as possible, yet still have substantial clearance over the rugged terrain. The compactness of the ATV forces its parts, and weight, upward, thereby raising the center of gravity. Thus, a trade-off exists with overall dimensions and clearances of the ATV and its overall stability.

Due to the compact design of an ATV, space between the parts of an ATV is very tight. A frame holds the entire ATV together and the engine generally sits in the center of the frame. Other components of the ATV are placed around the engine where appropriate space is available and are typically positioned to facilitate access thereto. For instance, the fuel tank typically is positioned so that it is readily accessible and so that the ATV can be easily fueled.

Figure 1A:
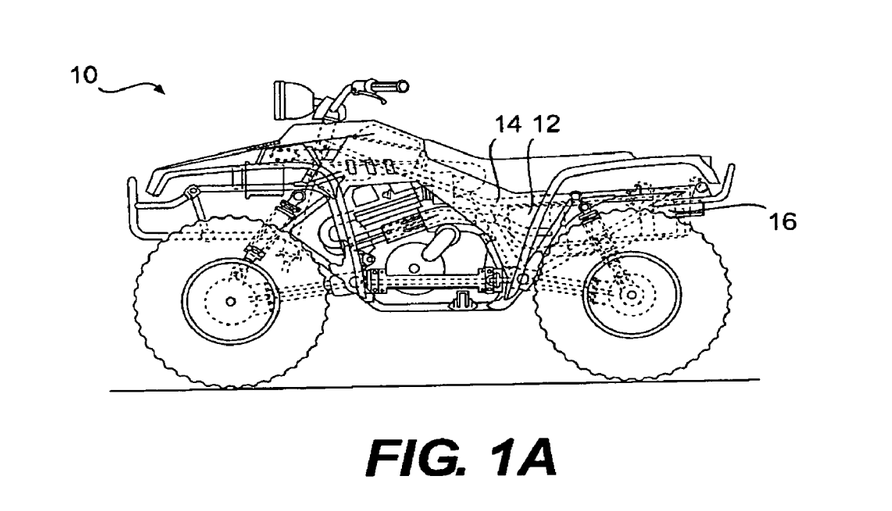
FIG. 1a is a side view of a prior art ATV.
Figure 1B:
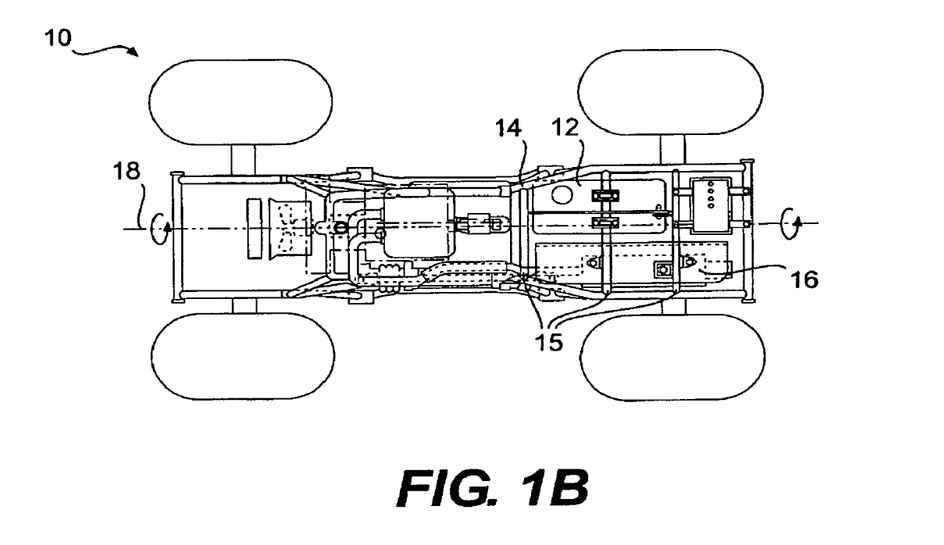

FIG. 1a illustrates a side view of a prior art ATV that is disclosed in U.S. Pat. No. 4,757,872 ('872 patent). FIG. 1b provides a top view of the same prior art ATV shown in FIG. 1a without many of the components that are located on top of the ATV. The '872 patent discloses an ATV 10 with a body frame 14 and a fuel tank 12 located towards the rear of the ATV 10. The body frame 14 is a conventional "space" frame that utilizes a relatively complex network of interconnected tubular members. The body frame 14 includes laterally extending cross members 15. The fuel tank 12 is disposed on one side of a longitudinal centerline 18 of the body frame 14 and is essentially hung from the laterally extending cross members 15 located at the top of the frame 14. An exhaust muffler 16 is disposed on the other side of the longitudinal centerline 18 of the body frame 14. By locating the fuel tank 12 just beneath the top of the body frame 14, the fuel tank 12 is relatively easy to access.

On some prior art ATVs, the fuel tank is disposed even further towards the rear of the ATV and directly above the axle of one of the rear wheels, while the muffler is disposed directly above the axle of the opposite rear wheel. The placement of the fuel tank towards the rear of the ATV, as illustrated in FIGS. 1a and 1b, and especially over the axle of one of the rear wheels, creates two potential problems. First, it causes the center of gravity for the fuel tank, and, hence for the entire ATV to be relatively high, thereby decreasing stability of the ATV. Second, by having the fuel tank located adjacent one rear wheel, the fuel tank must have walls thick enough to withstand the impact of foreign objects, such as rocks, that are kicked up by the wheel. This necessarily increases the weight of the fuel tank, further contributing to a high center of gravity and decreased stability for the ATV.

Figure 2:
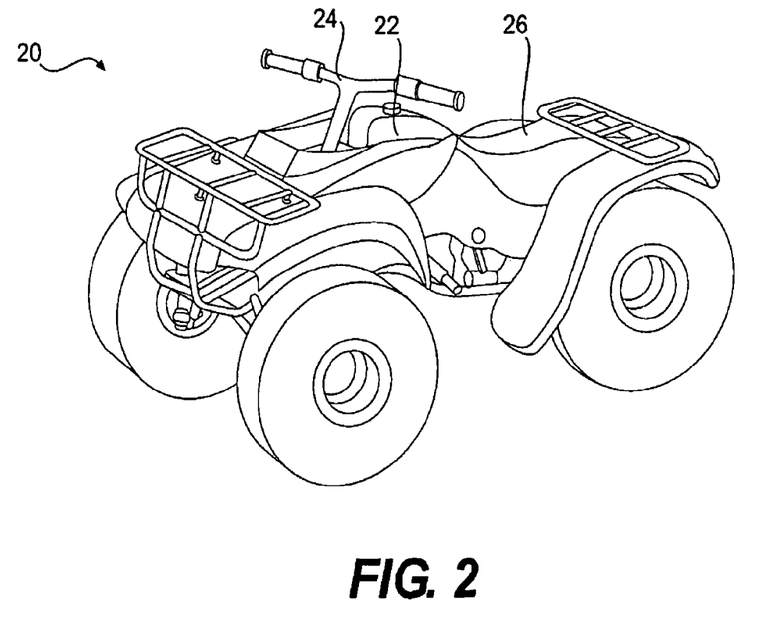
FIG. 2 is a front perspective view of another prior art ATV.

FIG. 2 illustrates a different prior art ATV that is disclosed in U.S. Pat. No. 5,791,431 ('431 patent). The '431 patent discloses an ATV 20 with a fuel tank 22 that is disposed on the upper portion of the frame (not shown), in between a steering handlebar 24 and a passenger seat 26. Although the fuel tank 22 is easily accessible, the fuel tank 22 is above the engine (not shown) and contributes to a relatively high center of gravity, as in the previous example. Again, the problem with this fuel tank 22 location is that the center of gravity of the fuel tank 22 is relatively high, making the ATV 20 more top heavy and less stable than is desired.

Thus, there is a need for an improved fuel tank position on the ATV so that the stability of the ATV may be improved. Specifically, there is a need to locate the fuel tank as low as possible on the ATV and away from the wheels of the ATV, while still providing accessibility to the fuel tank.

SUMMARY OF THE INVENTION

It is, therefore, an aspect of the present invention is to provide an ATV with improved stability.

Another aspect of the present invention is to provide an ATV with a lower center of gravity.

Another aspect of the present invention is to provide an ATV with a fuel tank located away from the wheels of the ATV.

Yet another aspect of the present invention is to provide an ATV with an easily accessible fuel tank.

One embodiment of the present invention provides an ATV with a frame that is substantially centered on a longitudinal centerline of the vehicle, an engine that is disposed on the frame, and a plurality of wheels. The wheels include low pressure balloon-type tires. Two wheels are attached to a front axle and two wheels are attached to a rear axle. A handle bar is operatively connected to at least two of the wheels to provide directional control, and a straddle seat is disposed above the frame. A fuel tank is fluidly connected to the engine, and is disposed forward of the rear axle, substantially above a rear suspension pivot point, and below the seat, and is substantially centered on the longitudinal centerline.

Another embodiment of the present invention provides an ATV with a frame. The frame includes an upper member, a lower member, a forward cross member, and a rearward cross member. The upper and lower members are positioned along a longitudinal centerline of the vehicle. The forward and rearward cross members connect the upper and lower members together. The upper and lower members are spaced apart from one another, and the forward and rearward members are spaced apart from one another. An engine is disposed on the frame between the upper and lower members and also between the forward and rearward cross members. A plurality of wheels that include low pressure balloon-type tires are suspended from the frame. At least one of the wheels is powered by the engine. A handle bar is operatively connected to at least two of the wheels to provide directional control. A fuel tank is attached to the rearward cross member of the frame.

These and other aspects of embodiments of the invention will become apparent when taken in conjunction with the following detailed description and drawings.

BRIEF DESCRIPTION OF THE DRAWINGS

Preferred embodiments of the invention will be described in conjunction with the following drawings, wherein:

FIG. 1b is a top view of the prior art ATV shown in FIG. 1a;

DETAILED DESCRIPTION OF EMBODIMENTS OF THE INVENTION

Figure 3:
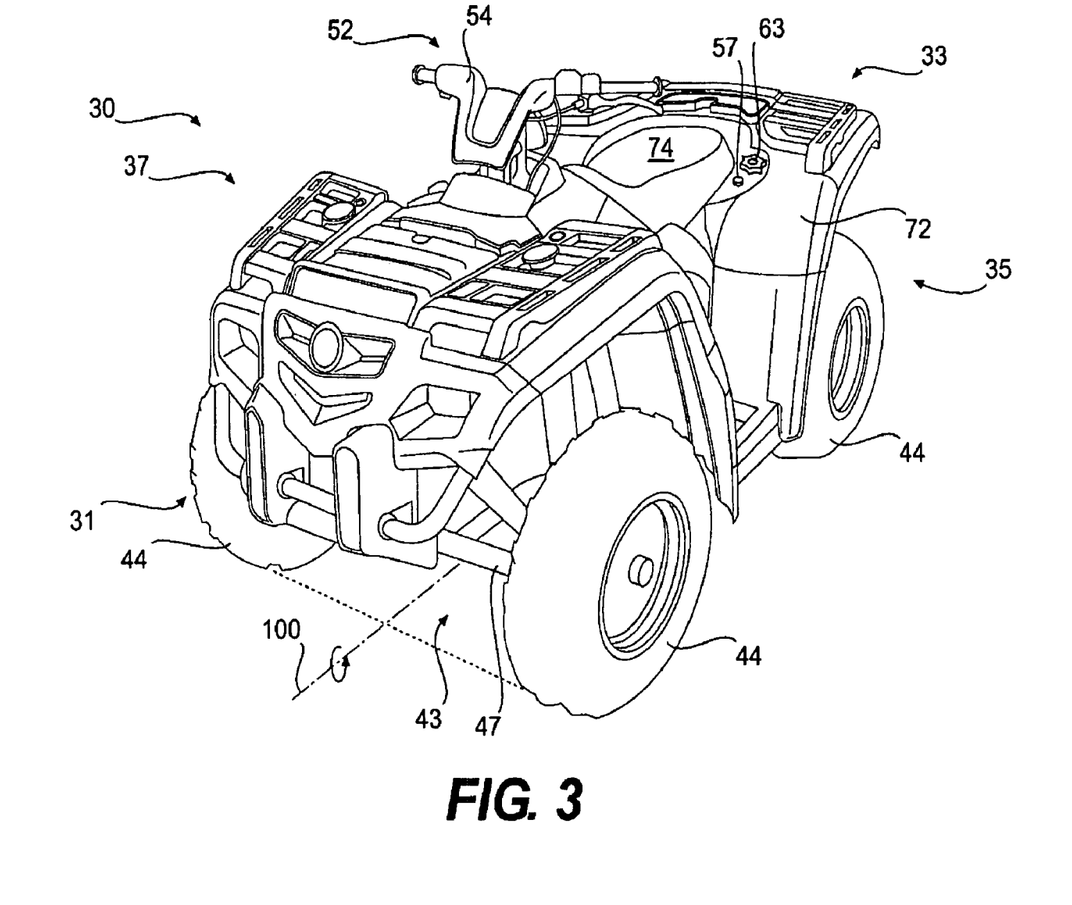
FIG. 3 is a front perspective view of one embodiment of the ATV of the present invention.
Figure 4:
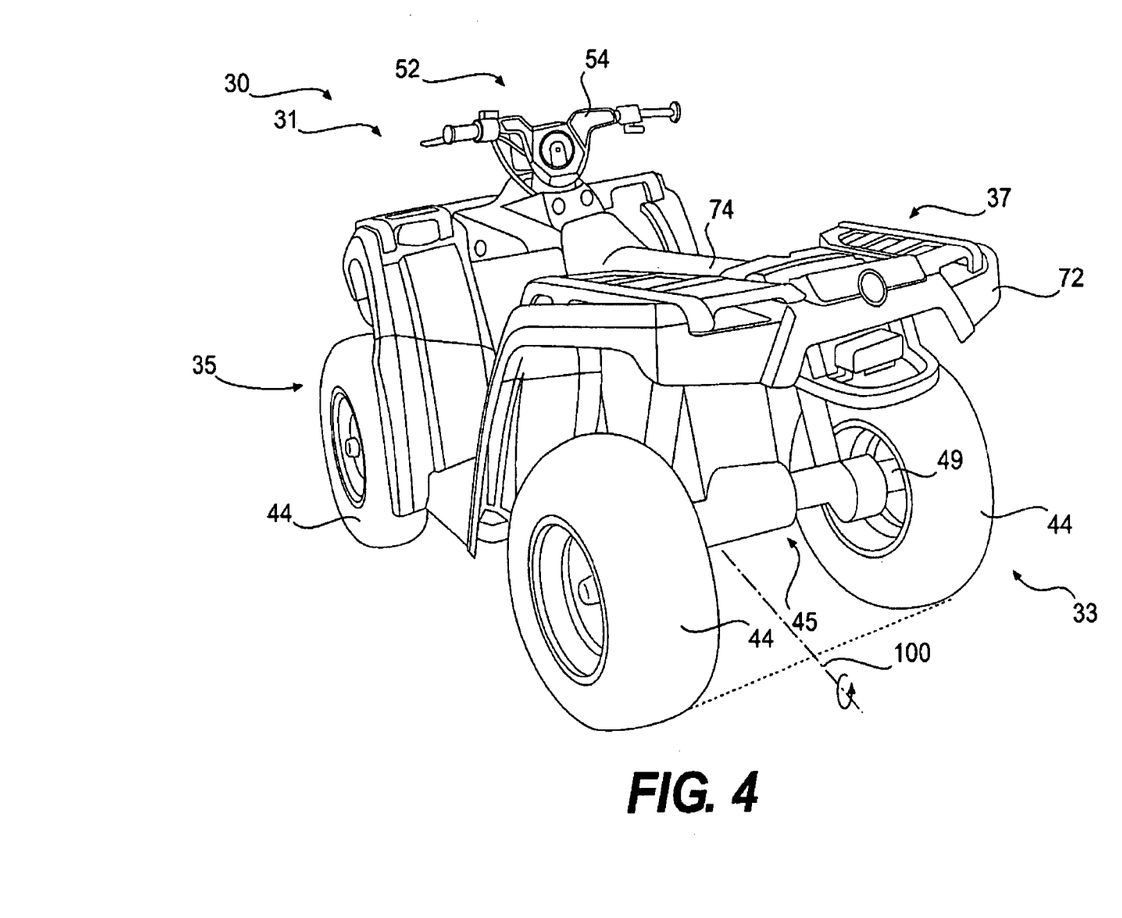
FIG. 4 is a rear perspective view of the ATV illustrated in FIG. 3.
Figure 5:
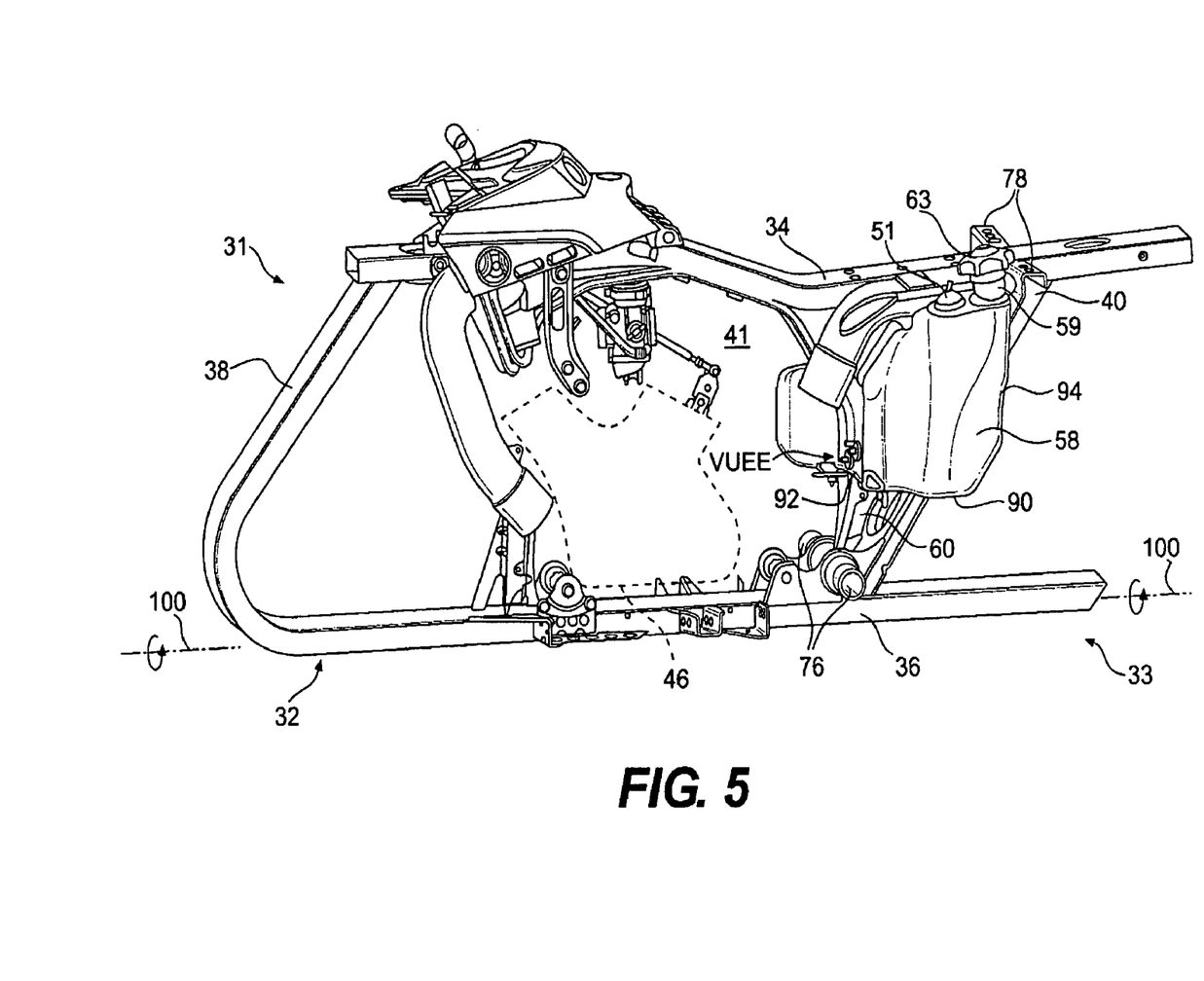
FIG. 5 is a left side perspective view of one embodiment of a frame of the ATV shown in FIGS. 3 and 4 with a fuel tank attached to the frame.

FIGS. 3–5 illustrate one embodiment of an ATV of the present invention. The all-terrain vehicle 30 includes a frame 32, a front suspension system 43, a rear suspension system 45, a plurality of wheels 44, a steering unit 52, an engine 46, a drive system (not shown), an exhaust system (not shown), a body 72, a passenger seat 74, and a fuel tank 58. The ATV 30 further includes a front portion 31, a rear portion 33, a left side 35, and a right side 37. The front 31, rear 33, left 35, and right 37 sides are defined according to the normal, forward travel direction of the ATV 30.

As will be made apparent from the description that follows, a number of the components of the ATV 30 of the present invention are not illustrated. The components that are not illustrated may be of any type known to those skilled in the art. The components are omitted to facilitate an understanding of the invention without cluttering the drawings appended hereto.

The ATV 30 further includes a longitudinal centerline 100. The frame 32 is generally positioned along the longitudinal centerline 100 of the ATV 30, thereby creating the backbone of the ATV 30. The longitudinal centerline 100 of the ATV 30 is, thus, the longitudinal centerline 100 of the frame 32 as well. The other components of the ATV 30 are disposed relative to the frame 32.

One embodiment of the frame 32 is illustrated in greater detail in FIGS. 4 and 5. This type of frame 32 is discussed in greater detail in U.S. patent application Ser. No. 09/824,878, currently pending, the entirety of which is incorporated by reference. The frame 32 includes an upper member 34, a lower member 36, a forward cross member 38, and a rearward cross member 40. In the preferred embodiment, the upper member 34 and the lower member 36 extend along the longitudinal centerline 100 of the ATV 30 and are substantially parallel. Also, the forward 38 and the rearward 40 cross members are disposed between the upper member 34 and the lower member 36, connecting the upper 34 and lower 36 members together. The upper 34 and lower 36 members are spaced apart from one another, and the forward 38 and rearward 40 cross members are spaced apart from one another, such that the upper member 34, the lower member 36, the forward cross member 38, and the rearward cross member 40 are connected together to define a cavity 41 therebetween.

The frame 32 can be manufactured from materials well known in the art, including but not limited to steel, aluminum, or a composite material. The cross section of the members 34, 36, 38, 40 of the frame 32 may be solid or may be hollow. Preferably, the members 34, 36, 38, 40 of the frame 32 are hollow, as illustrated in FIGS. 4 and 5. The shape of the cross section of the members 34, 36, 38, 40 of the frame may be any shape, such as round, elongated, elliptical, ovoid, triangular, square, rectangular, or multi-sided. Preferably, the shape of the cross section of the members 34, 36, 38, 40 of the frame is generally elongated, such that a first dimension is relatively greater than a second dimension normal to the first dimension. For example, the members 34, 36, 38, 40 of the frame 32 may have a rectangular cross section, as illustrated in FIGS. 4 and 5.

The forward cross member 38 and rearward cross member 40 can be attached to the upper member 34 and lower member 36 by conventional means, such as by welding or by any other type of fastening system, including bolts. As illustrated in FIGS. 4 and 5, a forward portion of the lower member 36 may be curved generally upward, thereby creating the forward cross member 38, or a portion of the forward cross member 38. Similarly, a forward portion of the upper member 34 may be curved generally downward towards the lower member 36 to create the forward cross member 38, or a portion of the forward cross member 38. Also, a rearward portion of the lower member 36 may be curved generally upward, thereby creating the rearward cross member 40, or a portion of the rearward cross member 40. Likewise, a rearward portion of the upper member 34 may be curved generally downward to create the rearward cross member 40, or a portion of the rearward cross member 40. It is recognized that any combination of curved members may be used to create the frame 32.

Figure 6:
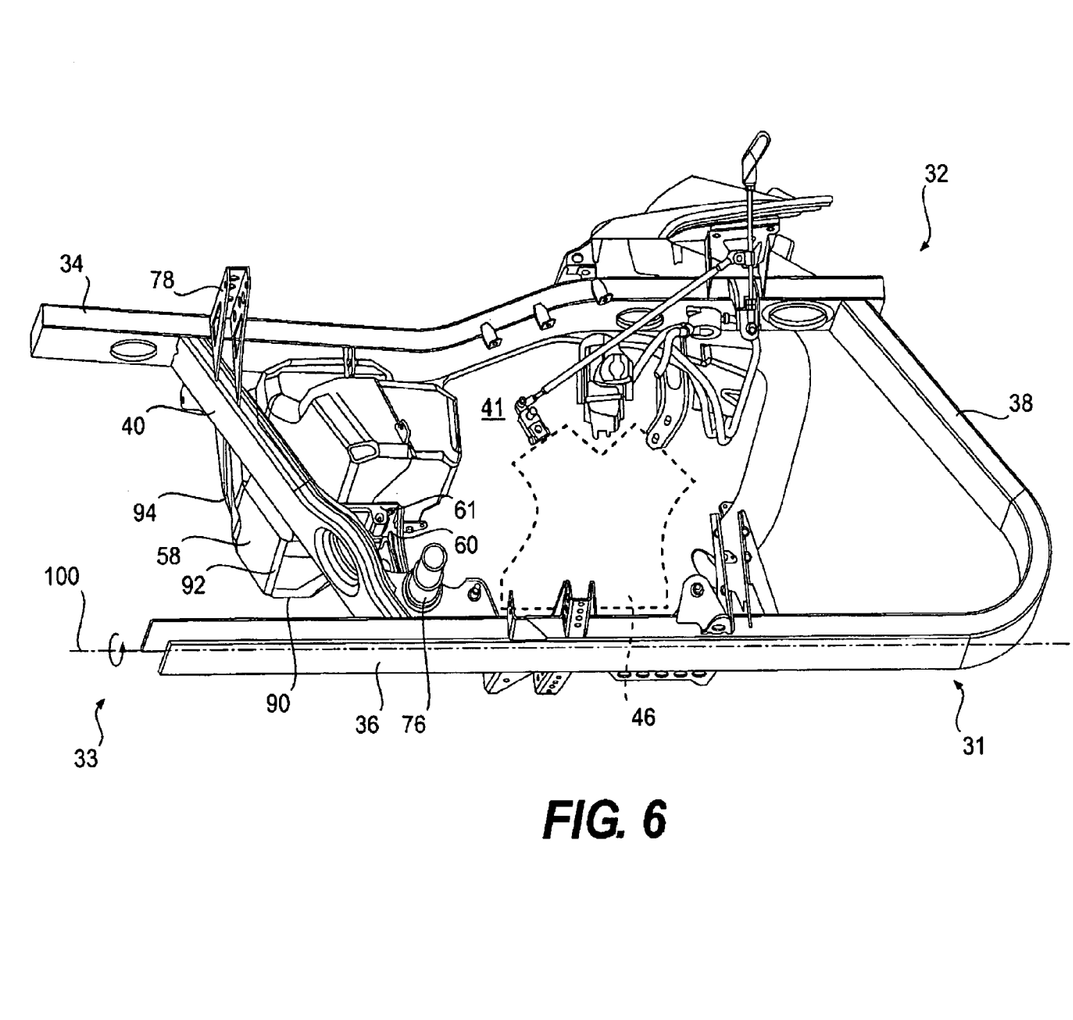
FIG. 6 is a right side perspective view of the frame of the ATV shown in FIG. 5 with a fuel tank attached to the frame.

Another embodiment of the frame 132, is illustrated in FIG. 6. In FIG. 6, the frame 132 includes at least two upper members 134, at least two lower members 136, at least two forward cross members 138 and at least two rearward cross members 140. The upper members 134 and lower members 136 are substantially parallel to one another. At least two forward cross members 138 and at least two rearward cross members 140 are disposed in between and attached to the upper members 134 and lower members 136. Each upper member 134 is spaced apart and at least one rearward cross member 140 is disposed in between and attached to the upper members 134. Each lower member 136 is spaced apart and at least one forward cross member 138 and at least one rearward cross member 140 is disposed in between and attached to the lower members 136. The frame 132 is generally positioned along the longitudinal centerline 100 of the ATV 30, thereby creating the skeleton of the ATV 30. The longitudinal centerline 100 of the ATV 30 is, thus, the longitudinal centerline 100 of the frame 132 as well. The other components of the ATV 30 are disposed relative to the frame 132.

Figure 7:
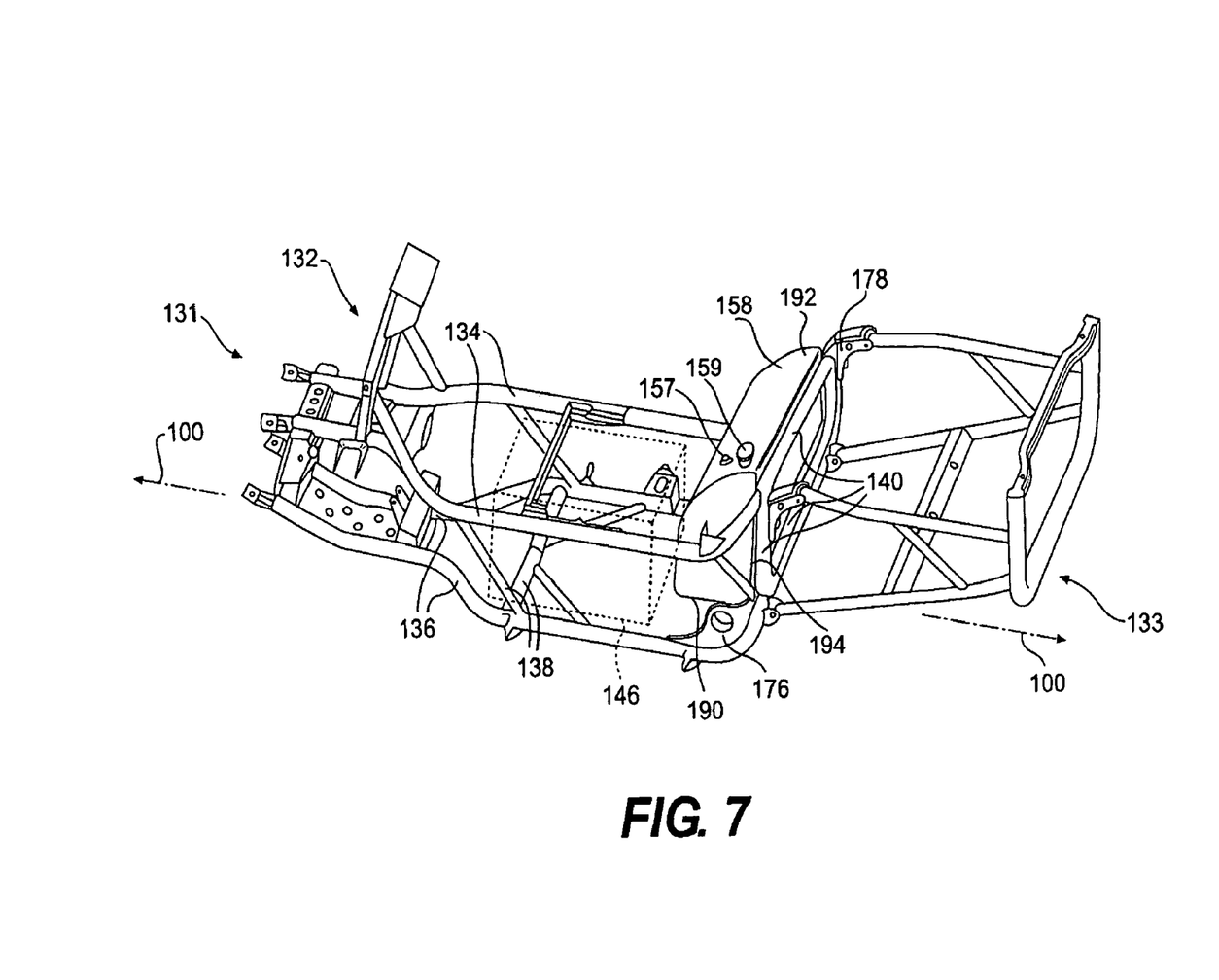
FIG. 7 is a front perspective view of another embodiment of the frame of the ATV, with a fuel tank attached to the frame.

Although it is recognized that the additional components of the ATV 30 of the present invention may be disposed about either frame 32, 132, reference to the frame 32 illustrated in FIGS. 5 and 6 will be made. It is understood that the frame 132 illustrated in FIG. 7 may be substituted in the following discussion.

The front suspension system 43 may be attached to a forward portion of the lower member 36 of the frame 32 and a forward portion of the upper member 34 of the frame 36 by conventional methods, such as welding. Similarly, the rear suspension system 45 may be attached to a rear portion of the lower member 36 of the frame 32 and a rear portion of the upper member 34 of the frame 32.

The rear suspension system 45 may be attached to the lower member 36 of the frame 32 at the rearward cross member 40 by connecting members 76 and to the upper member 34 of the frame 32 at the rearward cross member 40 by connecting members 78. In the preferred embodiment, as illustrated in FIGS. 5 and 6, the connecting members 76 are fixedly attached to both the lower member 36 and the rearward cross member 40 of the frame 32 and provide a pivot point for the rear suspension system 45. Similarly, the connecting members 78 are fixedly attached to both the upper member 34 and the rearward member 40 of the frame 32. This configuration gives the rear suspension system 45 additional strength and support.

The front suspension system 43 includes a front axle 47, and may further include a pair of shock absorbers (not shown). Likewise, the rear suspension system 45 includes a rear axle 49 and may further include a pair of shock absorbers (not shown). The rear suspension system 45 further includes a plurality of support arms (not shown). The support arms are attached to the connecting members 76, 78 at a first end and extend rearward. A second end of the support arms are operatively connected to the rear axle 49. Thus, the rear axle 49 is necessarily located rearward of the connecting members 76, 78.

The plurality of wheels 44 are suspended from the frame 32 such that at least one of the wheels 44 is powered by the engine 46. The plurality of wheels 44 are operatively connected to the front 43 and rear 45 suspension systems. In the preferred embodiment, a pair of wheels 44 are operatively connected to the front suspension system 43 and a pair of wheels 44 are attached to the rear suspension system 45, such that two wheels 44 are disposed on the left side 35 of the ATV 30 and two wheels 44 are disposed on the right side 33 of the ATV 30. The wheels 44 are specifically located to provide the ATV 30 with stability. The wheels 44 include low pressure balloon-type tires that are of a conventional type well known in the art and are sized to support the weight of the ATV 30 such that the ATV 30 can move easily across rugged terrain.

The steering unit 52 is disposed towards the front 31 of the ATV 30. The steering unit 52 is operatively connected to at least two of the wheels 44 to provide directional control. The steering unit 52 includes a steering column (not shown) and a steering member 54, such as a handlebar as shown in FIGS. 3 and 4. The steering column has a first end and a second end and rotates about an centerline. The first end of the steering column is operatively connected to the steering member 54. The steering member 54 is disposed outside of the cavity 41 of the frame 32 and above the upper member 34 of the frame 32. As would be appreciated by those skilled in the art, the steering member 54 can include handle bars, a steering wheel, or any other steering-type device.

In the preferred embodiment, the steering column passes through the upper member 34 of the frame 32 into the cavity 41 of the frame 32. The second end of the steering column 56 is operatively connected to the front suspension subsystem 43 that is operatively connected to the pair of wheels 44, such that the pair of wheels 44 can be manipulated by the rotation of the steering column 56. Thus, the steering member 54 is used by a driver (not shown) of the ATV 30 to control the direction of the ATV 30.

In the preferred embodiment, the engine 46 is disposed on the frame 32 between the upper member 34 and the lower member 36 and also between the forward cross member 38 and the rearward cross member 40, and is fixedly attached to the lower member 36 of the frame 32. The engine 46 is a gasoline (or similar fuel type) powered engine and is preferably an internal combustion engine with enough horse power to meet the requirements of the ATV 30.

The drive system includes a transmission (not shown) that is operatively coupled to the engine 46. The transmission is disposed within the cavity 41 adjacent to the engine 46, and is fixedly attached to the lower member 36 of the frame 32. The transmission provides rotational movement that is transmitted along a drive train (not shown) to at least one axle 47, 49. The powered axle provides rotational movement to the plurality of wheels 44.

The exhaust system is operatively connected to the engine 46. The exhaust system includes an exhaust muffler and an exhaust pipe. The exhaust pipe includes a first end and a second end. The first end of the exhaust pipe is attached to the engine 46. In the preferred embodiment, the exhaust pipe extends from the engine 46 substantially rearward. The second end of the exhaust pipe is attached to the exhaust muffler. The exhaust muffler is disposed outside of the cavity 41 of the frame 32 in the rear portion 33 of the ATV 30. The exhaust pipe may extend on either the left side 35 or right side 37 of the ATV 30. It is also contemplated that two exhaust pipes may extend from the engine 46, one on either side of the ATV 30.

The ATV 30 further includes a plurality of body mounting members (not shown). The body mounting members are fixedly attached to the upper member 34 of the frame 32 and extend laterally outwardly from the upper member 34. The body 72 of the ATV 30 is disposed above the upper member 34 of the frame 32 and is fixedly attached to the body mounting members such that the body 72 covers all of the body mounting members. Standard fastening systems, such as bolts, lock washers, and nuts, may be used to attach the body 72 to the body mounting members. Preferably, the body 52 is formed from plastic. Alternatively, the body may be formed from metal, such as steel. Preferably, the body 52 includes more than one piece.

A passenger seat 74 is disposed above the body 72. Preferably, the seat 74 is a straddle-type seat of a known design. The seat 74 is centered on the longitudinal centerline 100 of the ATV 30 and is attached in such a way that it can be at least partially removed from the ATV 30. Preferably, the seat 74 is hinged at one end to the upper member 34 of the frame 32 and latched at the opposite end. This allows the seat 74 to normally be firmly attached to the ATV 30. However, if parts located beneath the seat 74 need to be accessed, the seat 74 can be unlatched at one end and swung upwardly about an axis. This way, the seat 74 is still attached to the ATV 30, and can be easily returned to its normal position. Alternatively, the seat 74 may be attached to the ATV 30 in such a way that the seat 74 may be easily completely removed from the ATV 30, if needed.

The fuel tank 58 is fluidly connected to the engine 46 and is a hollow vessel with a top side and a bottom side. The fuel tank 58 holds fuel for operation of the engine 46. In the preferred embodiment, the fuel tank 58 is disposed forward of the rear axle 49, below the seat 74 and is substantially centered on the longitudinal centerline 100. In one embodiment, the fuel tank 58 is attached to the rearward cross member 40 of the frame 32. In another embodiment, the fuel tank 58 is disposed within the cavity 41 of the frame 32.

The fuel tank 58 includes a longitudinal dimension 90 that is substantially parallel to the longitudinal centerline 100, a lateral dimension 92 that is substantially perpendicular to the longitudinal centerline 100, and a height 94 that is substantially perpendicular to the longitudinal centerline 100. In the preferred embodiment, lateral dimension 92 is greater than the longitudinal dimension 90. In another embodiment, the height 94 is greater than the longitudinal dimension 90. Alternatively, the fuel tank 58 may be of any shape. The fuel tank 58 may be designed for optimum capacity to fit within the confined space on the ATV 30. For example, the fuel tank 58 may include a shape that allows the fuel tank 58 to at least partially surround the rearward cross member 40 of the frame 32, as shown in FIG. 6. Preferably, the fuel tank 58 is designed so that the weight of the fuel is properly balanced on the ATV 30.

In one embodiment, a fuel tank mounting bracket 60 is disposed within the cavity 41 of the frame 32, adjacent to the rearward cross member 40 and the lower member 36 of the frame 32, such that a platform 61 is created. The platform 61 is preferably substantially parallel to the lower member 36 of the frame 32. Preferably, the fuel tank mounting bracket 60 is fixedly attached to the lower member 34 and the rearward member 40 of the frame 32 and the bottom side of the fuel tank 58 is fixedly attached to the platform 61.

The fuel tank 58 is preferably made from a molded plastic material. Any plastic material with superior chemical resistance to gasoline (or similar fuel type) can be used. Preferably, the fuel tank 58 is molded from a polyolefin, such as polypropylene or high density polyethylene. Conventional molding processes, such as blow molding or injection molding may be used to form the fuel tank 58. Alternatively, the fuel tank 58 may be made from metal, such as aluminum or steel.

In the preferred embodiment, there is at least one opening on the top side of the fuel tank 58. FIG. 5 illustrates two openings on the top side of the fuel tank 58. One opening functions as a fuel inlet port 59, while a second opening may be used for a fuel gauge 57. The fuel inlet port 59 provides a substantially round opening large enough for a nozzle of a gas can or a gas pump to be inserted. Preferably, the fuel inlet port 59 and the fuel gauge 57 are disposed adjacent to the seat 74. More preferably, the fuel inlet port 59 and the fuel gauge 57 are disposed at a lateral side of the seat 74, as illustrated in FIG. 3.

The ATV 30 further includes a fuel tank cap 63. The fuel tank cap 63 is disposed at the fuel inlet port 59 so that the fuel tank 58 can be closed by the cap 63. The fuel tank cap 63 and the fuel inlet port 59 are designed to complement each other so that the fuel tank cap 63 fits snugly onto the fuel inlet port 59. Preferably, the fuel inlet port 59 and fuel tank cap 63 are each threaded so that the fuel tank cap 63 can be screwed onto the fuel inlet port 59. Alternatively, the fuel tank cap 63 and fuel inlet port 59 may be designed so that the fuel tank cap 63 snaps onto the fuel inlet port 59.

Preferably, the fuel tank cap 63 is molded from a plastic material with superior chemical resistance to gasoline (or similar fuel type). The fuel tank cap 63 is designed so that it can be easily grasped and removed from the fuel inlet port 59. Preferably, the fuel tank cap 63 has a gear-like shape, as illustrated in FIGS. 3 and 5. The fuel tank cap 63 and the fuel inlet port 59 are positioned so that an operator of the ATV 30 can easily access them, as illustrated in FIG. 3. In the preferred embodiment, the fuel inlet port 59 and fuel tank cap 63 are disposed adjacent to the upper member 34 of the frame 32.

The advantage of this location of the fuel tank 58 as compared to the prior art is that the center of gravity of the fuel tank 58, and, hence, of the ATV 30 is lowered. Also, by being located within the cavity 41 of the frame 32, the fuel tank 58 is better protected from foreign objects that are kicked up by the wheels 44.

It is believed that the construction of the ATV 30 provides several advantages over prior art vehicles. Among them, it is believed that at least the combination of the frame 32 and the fuel tank 58 provide for the construction of an ATV that is both lighter (in weight) and has a lower center of gravity than prior art ATVs. The lower weight and lower center of gravity contribute to enhanced operation. In addition, the lower center of gravity contributes to enhanced stability.

The frame 32 of the ATV 30 illustrated in FIGS. 5 and 6 differs from the frames of the ATVs 10, 20 illustrated in FIGS. 1a, 1b, and 2, because the frame 32 is positioned substantially at the centerline 100 of the ATV 30. In FIGS. 5 and 6, it is evident that the frame 32 is disposed at the centerline 100 of the ATV 30. While this arrangement is preferred, the frame 32 may be positioned slightly to either side of the centerline 100 without departing from the scope of the present invention. In this regard, the term "substantially" is meant to reflect that the frame 32 need not be positioned exactly on the centerline 100 of the ATV 30.

With the frame 32 positioned substantially at the centerline 100 of the ATV 30, the fuel tank 58 may be affixed to the rear cross member 40 so that the fuel tank is substantially evenly balanced on the frame 32. This offers superior lateral stability for the ATV 30, among other features. Also, as discussed above, the positioning of the fuel tank 58 adjacent to the rear cross member 40 reduces (or eliminates) potential puncturing of the fuel tank 58 during operation of the ATV 30.

While preferred embodiments of the invention have been shown and described, it is evident that variations and modifications are possible that are within the scope of the preferred embodiments described herein.

What is claimed is:

1. An all-terrain vehicle comprising:
   a frame substantially centered on a longitudinal centerline of the vehicle;
   an engine disposed on the frame;
   a plurality of wheels comprising tires, wherein two wheels are attached to a front axle and two wheels are attached to a rear axle, the rear axle being pivotably attached to the frame at a rear suspension pivot point;
   a handle bar operatively connected to at least two of the wheels to provide directional control;
   a straddle seat disposed above the frame; and
   a fuel tank fluidly connected to the engine, wherein the fuel tank is disposed forward of the rear axle, substantially above the rear suspension pivot point, and below the seat, and is substantially centered on the longitudinal centerline.

2. The all-terrain vehicle of claim 1, wherein the fuel tank comprises a shape that allows the fuel tank to at least partially surround a member of the frame.

3. The all-terrain vehicle of claim 1, wherein the fuel tank comprises a fuel inlet port, wherein the fuel inlet part is disposed adjacent to the seat.

4. The all-terrain vehicle of claim 3, wherein the fuel tank further comprises a fuel gauge, wherein the fuel gauge is disposed adjacent to the fuel inlet port.

5. The all-terrain vehicle of claim 1, wherein the fuel tank comprises a longitudinal dimension substantially parallel to the longitudinal centerline, a lateral dimension substantially perpendicular to the longitudinal dimension and a height.

6. The all-terrain vehicle of claim 1, wherein the frame comprises an upper member, a lower member, a forward cross member, and a rearward cross member, the upper and lower members being positioned along the longitudinal centerline, the forward and rearward cross members connecting the upper and lower members together, the upper and lower members being spaced apart from one another, and the forward and rearward cross members being spaced apart from one another.

7. The all-terrain vehicle of claim 6, wherein the fuel tank is attached to the frame.

8. The all-terrain vehicle of claim 6, wherein the upper member and the lower member are substantially parallel.

9. The all-terrain vehicle of claim 6, wherein the upper member, the lower member, the forward cross member, and the rearward cross member are connected together to define a cavity therebetween.

10. The all-terrain vehicle of claim 9, wherein the fuel tank is disposed within the cavity.

11. The all-terrain vehicle of claim 10, further comprising a fuel tank mounting bracket, wherein the fuel tank mounting bracket is disposed adjacent to the rearward cross member and the lower member of the frame.

12. The all-terrain vehicle of claim 11, wherein the fuel tank is fixedly attached to the fuel tank mounting bracket.

13. The all-terrain vehicle of claim 6, further comprising a fuel tank mounting bracket, wherein the fuel tank mounting bracket is disposed adjacent to the rearward cross member and the lower member of the frame.

14. The all-terrain vehicle of claim 13, wherein the fuel tank is fixedly attached to the fuel tank mounting bracket.

15. The all-terrain vehicle of claim 6, wherein at least one member of the frame is hollow.

16. The all-terrain vehicle of claim 6, wherein at least one member of the frame has an elongated cross section.

17. The all-terrain vehicle of claim 1, wherein the frame comprises at least two upper members, at least two lower members, at least two forward cross members, and at least two rearward cross members, the upper and lower members being substantially parallel, the forward and rearward cross members connecting the upper and lower members together, and the forward and rearward cross members being spaced apart from one another.

* * * * *